L. SCHLEGEL.
IRRIGATING DEVICE.
APPLICATION FILED MAR. 13, 1914.
1,166,789.
Patented Jan. 4, 1916.
3 SHEETS—SHEET 1.
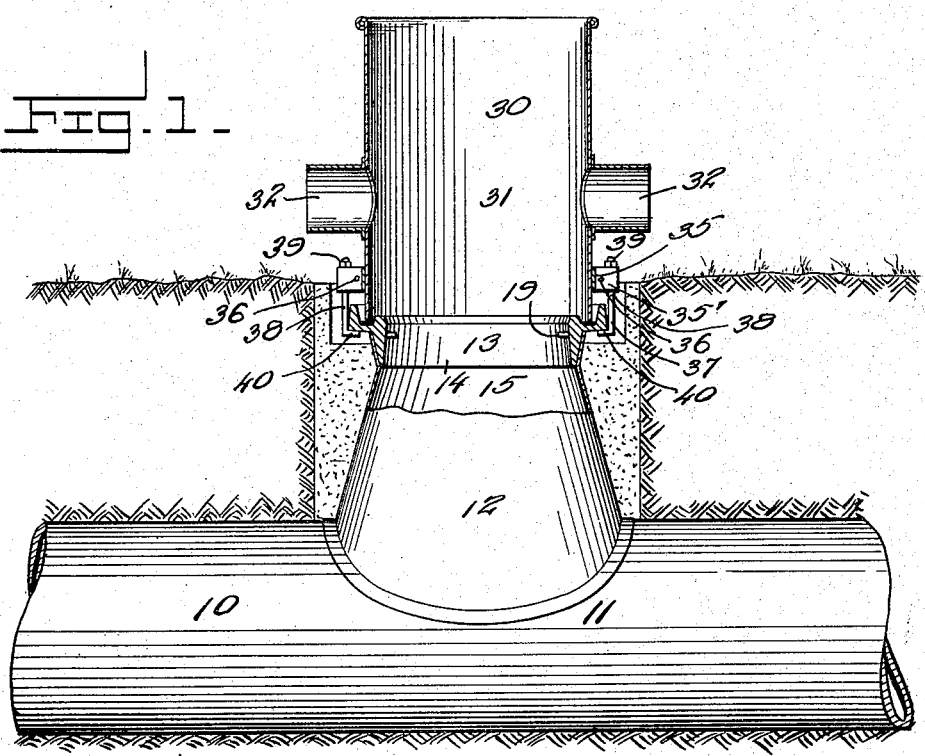
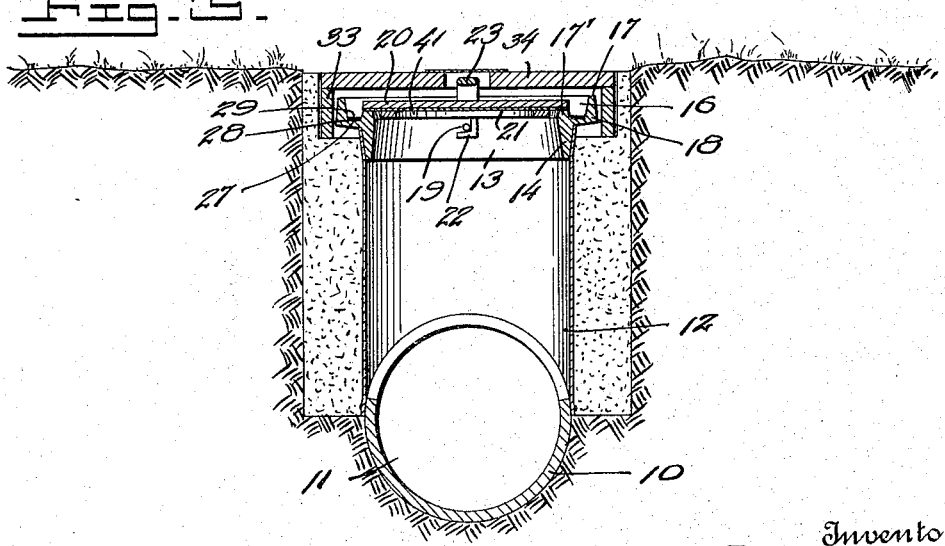
Inventor
L. Schlegel.
Witnesses
Attorney

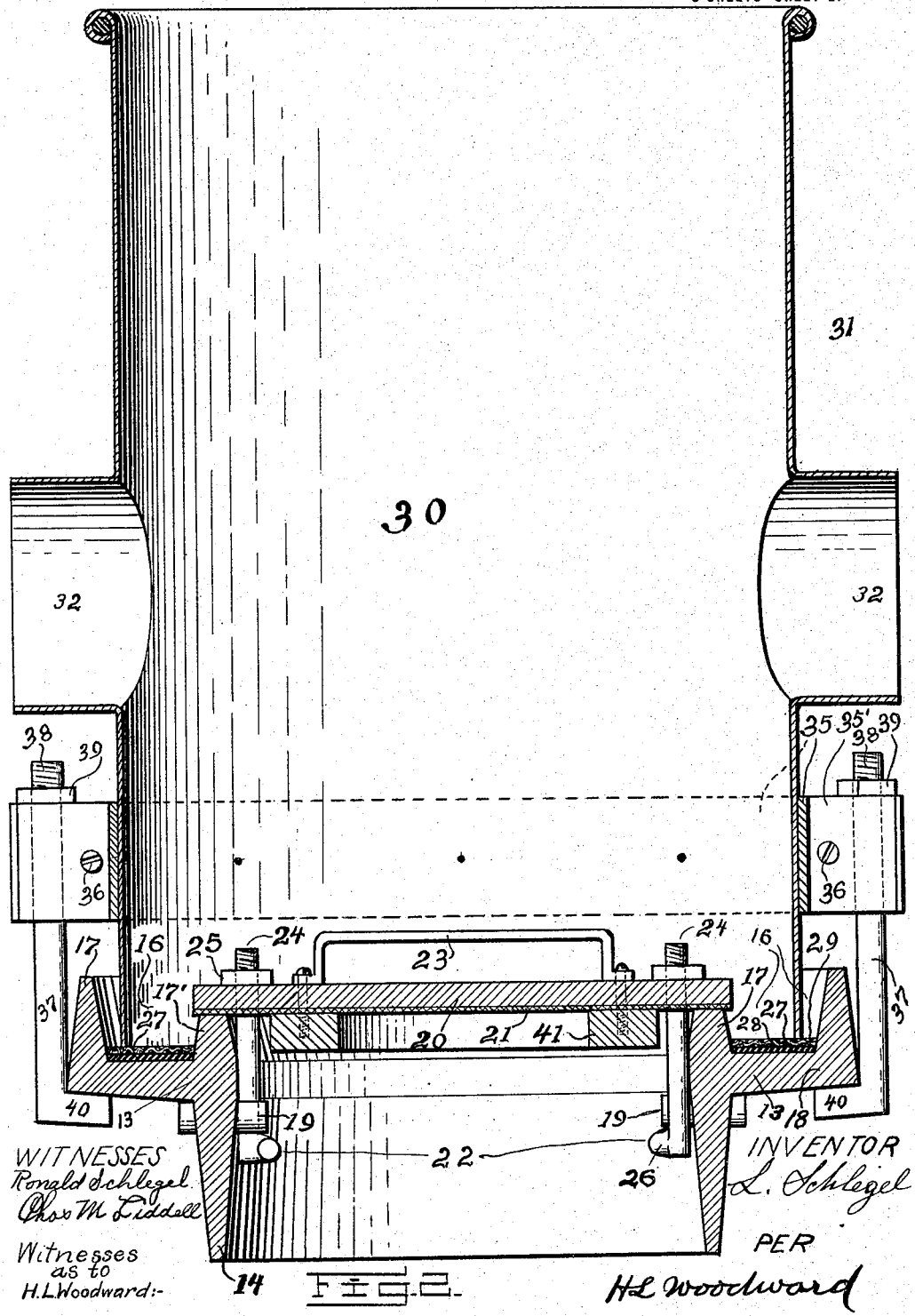

L. SCHLEGEL.
IRRIGATING DEVICE.
APPLICATION FILED MAR. 13, 1914.
1,166,789.
Patented Jan. 4, 1916.
3 SHEETS—SHEET 3.
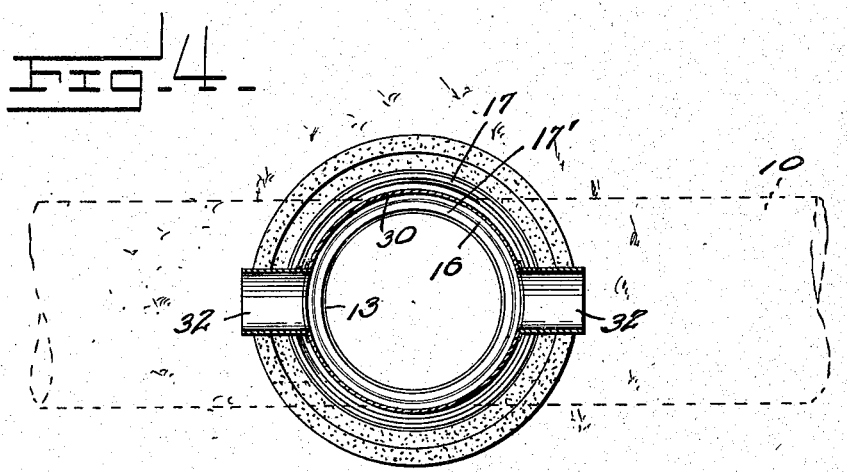
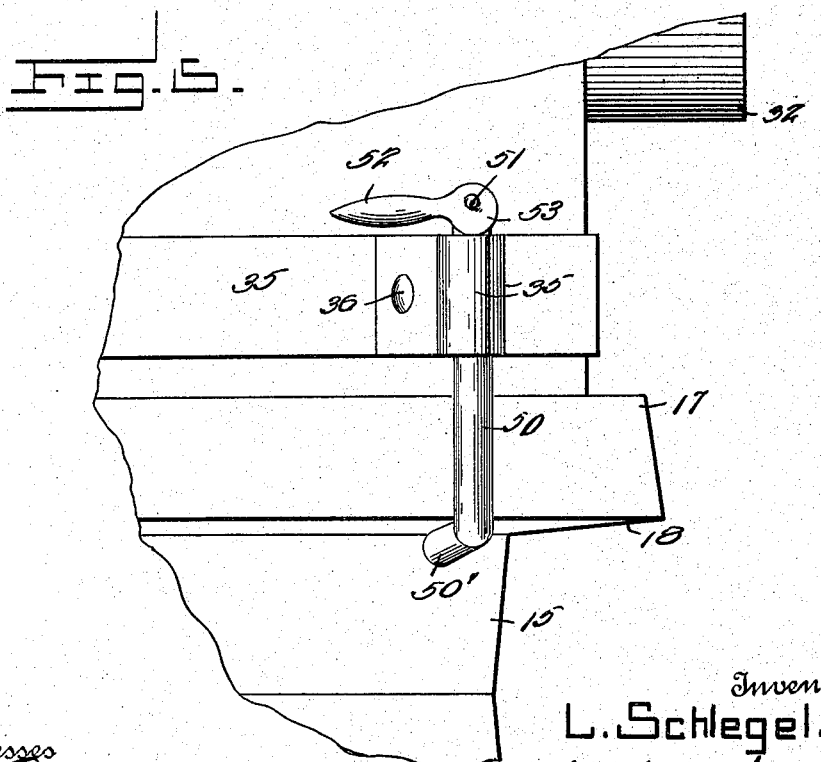

UNITED STATES PATENT OFFICE.

LEONARD SCHLEGEL, OF LOS ANGELES, CALIFORNIA.

IRRIGATING DEVICE.

1,166,789.  Specification of Letters Patent.  Patented Jan. 4, 1916.

Application filed March 13, 1914. Serial No. 824,410.

*To all whom it may concern:*

Be it known that I, LEONARD SCHLEGEL, a citizen of the United States, residing at Los Angeles, in the county of Los Angeles and State of California, have invented new and useful Improvements in Irrigating Devices, of which the following is a specification.

Irrigation by underground conduits is largely practised in this country, the usual method being to arrange a system of mains beneath the area to be irrigated, and provide hydrants, or hydrant connections at suitable intervals whereby the water may be admitted to a series of furrows of limited extent, or otherwise distributed over small areas. The ditch method for the latter detail is generally followed. By reason of the great potential fertility made available by water in most of the regions where such irrigation is practised, it is customary to plant at closer intervals than on ordinary farming land, so that a given area under irrigation usually has a greater value in productive capacity than a corresponding area where the natural rainfall and other conditions permit free plant growth.

An aim of the invention is to give a portable hydrant and terminal especially adapted to facilitate formation of a connection with a main below the surface of the ground.

It is also a valuable feature of the invention that a simple cutoff is presented liable in a minimum degree to derangement. A desirable attainment, too, is the fact that all elements may be produced at an extremely low cost.

Additional objects, advantages and features of invention will appear, some of which will be apparent from the following description and from the drawings, in which—

Figure 1 is a sectional view of a part of a main, with a hydrant terminal, and the hydrant in position. Fig. 2 is a detail section of the hydrant and seat. Fig. 3 is a detail of the pit. Fig. 4 is a cross section of the hydrant. Fig. 5 shows a modification of the clamp.

There is illustrated an underground water main 10 of any suitable construction, sheet metal being indicated in the present case. Connected in the main there is a T 11, having an enlarged stem base 12, somewhat in the form of an inverted funnel, whereby the efficiency of a low pressure supply as is generally used in irrigation is greatly increased. The body of the T section is formed of heavy sheet metal, and of diameter to fit any size underground pipe, metal or cement, the upper end of the stem or lateral 15 being circular and slightly flared at its upper end. The enlargement of the base of the lateral is principally in a longitudinal direction with respect to the main 10, and the upper end of the lateral is nearly or quite equal in diameter to the diameter of the main. This is permissible and desirable, as but one lateral will take off water at a time under normal use. Set in the outer end of the lateral there is a casting 13 having a tapered annular flange 14 secured watertight in the upper end of the lateral 15. The casting terminates immediately above the lateral, and is provided with an annular concentric channel 16 therein, the outer side 17 of which is considerably higher than the inner side 17', and flared for a purpose to be indicated. This channeled portion comprises an enlargement 18 projecting some distance outwardly from the top of the lateral 15, the channel being of considerable breadth and yet, by being located without the diameter of the lateral 15 does not involve any restriction of the capacity of the lateral. The under side of the enlargement 18 is sloped downwardly from its outer side, for a purpose to be indicated.

Formed or fixed on the inner side of the casting just below the portion 17' there are diametrically opposed lugs or pins 19. The top of the portion 17' is finished to a smooth planiform surface, and engaged thereon there is a cap 20 having a rubber or other suitable gasket 21, and the cap is provided with the clamp hooks 22 turned in opposite directions, whereby when the cap is presented against the seat and rotated the hooks will engage under the lugs and hold the cap snugly in place. This cap corresponds in diameter to the portion 17', so that it does not project over the channel 16. The cap is provided with a hand hold 23 whereby it may be manipulated, although any other suitable means may be employed. The hooks 22 may have shank portions 24 extended slidably through the cap and provided with nuts 25 on top of the cap whereby they may be drawn tightly against the lugs if desired. The lower ends of the hooks are preferably in the form of tapered arms 26 so that under rotation of the cap it will be gradually tightened on its seat.

In the bottom of the channel 16 there is a gasket 27, which I preferably form in two parts, the lower a rubber ring 28 and the upper a woven protective fabric 29 of similar dimensions, although it may be thicker than the rubber. This gasket takes up the full width of the channel, and is intended to form a moderately tight joint with a portable light-weight hydrant 30, here shown as formed of sheet metal and consisting of a central cylindrical portion 31 open at each end, and having the two opposite spouts 32. The top of the outer side 17 of the casting 13 is a few inches below the top level of the ground, and surrounding the T there is a suitable housing 33 having a cover 34 formed integrally or rather attached to the housing, the cover resting upon the outer side 17, of the casting at the upper end of the T. This portion 17 is sufficiently high to support the cover clear of the cap, but as shown the cover requires to be recessed slightly for the hand hold 23, and the upper ends of the hook shanks 23' which are located outwardly of the ends of the hand hold. The cover and housing are formed of wood lumber and the hand hold is accommodated by forming an oblong opening in the cover, this opening being covered by a piece of sheet metal. The top of this cover is on or slightly below the level of the ground, and is put in place when the hydrant is removed. It will thus be seen that a field may be equipped with a system including a large number of outlets, without making an unsightly appearance, or interfering with the free movement of drills, cultivators and harvesters.

The hydrant has the lower edge portion of the cylinder 31 recurved so as to present a rounded surface upon the gasket 27, the diameter of the cylinder corresponding to the medial diameter of the channel 16, so that the emplacement of the hydrant in position upon the gasket will not be difficult. Fixed upon the cylinder 31 so as to clear the portion 17 of the outlet, there is a heavy ring 35 in two parts having opposed flange portions 35' receiving clamping bolts 36, therethrough, and having their outer ends formed to hold revolubly a clamp 37, at each side of the cylinder. The clamp consists of a threaded shank 38 extended revolubly between the flanges 35' and having the nut 39 engaged on its upper end, and a head 40 at the lower end of the shank adapted to engage under the enlargement 18, to draw the hydrant firmly against the casting 13 when the nuts are tightened. These flanges 35' are preferably located to one side of the respective spouts 32, which are spaced very closely thereover, so that the water discharged will cause a minimum of erosion—the latter being in itself an important attainment.

It is an important advantage of this construction that the hydrant may be quickly secured upon the outlet with the spouts extended in any direction, and no accuracy of adjustment is required. The gasket 21 is held in place by means of a metal ring 41 held against the under side of the cap 20 by screws engaged through the ends of the hand hold 23, and in suitable threaded openings in the ring 41.

In use, the covers are normally kept over the outlets, and a field equipped with this system will present an unobstructed appearance as far as the irrigating means is concerned. The covers will permit horses to step thereon with safety, and will support the wheels of such apparatus as may be driven upon the field. If desired, a filling of concrete may be introduced into the excavation for the T, the top of this filling being arranged to receive the edges of the housing 33. When a section of the field is to be irrigated, the local ditches being properly formed, the cover 34 is removed from over the outlet, and the lower end of the hydrant cylinder set in the channel 16 and the clamps 37 tightened. The spouts are of course directed toward feeder ditches terminating thereunder. The cap 20 is then removed by inserting the hand in the cylinder 31 and grasping the hand hold 23, giving it a rotating movement horizontally and lifting it up. If the cap has been tightly clamped, it would be necessary to first loosen the nuts 25 before turning the cap. The depth of the cylinder is sufficient to prevent the overflow of the water at the top, yet not such as to cause inconvenience to the operator. The provision of the fabric upper portion in the gasket 27 serves to prevent damage to the rubber by particles of sand and grit which are likely to get under the edge of the cylinder 31. The direction of the spouts may be quickly shifted by loosening the clamps 37, which do not require to be under great strain, on account of the low pressure of the water. Any other form of clamp may be employed, such, for instance, as shown in Fig. 5.

The system may of course be used in conjunction with movable surface pipe and in such connection it has a marked value over the customary hydrant construction. Heretofore, on account of the obstructions presented by the hydrants or their connections, it has been customary to limit the underground system and the number of outlets, and make up for this limited distribution by using surface pipe which in itself is as expensive in most cases as the underground pipe. A great deal of time in handling and expense for upkeep as well is involved by the surface pipe and it is an advantage of my invention that the amount of surface pipe may be greatly reduced, effecting a saving both in labor and upkeep. The sloping under side of the enlargement 18 of the casting 13 causes the clamps to tighten as they are turned inwardly, and it may be found unnecessary to move the nuts to tighten them sufficiently.

A modification of the clamp is shown in Fig. 5 where a clamp hook 50 similar to the one 37 is similarly held by the ring 35, being provided with an eye at its upper end in which there is engaged a pin 51 holding the cam lever 52 pivotally. At one limit of its movement of the lever the clamp is free for rotation by means of the lever to move the arm 50' inward or outward. When moved to the opposite limit, the cam 53 on the lever bears on the flanges of the ring drawing the hook upwardly.

What is claimed:

1. In a low pressure irrigating system a duct terminal having a manually operated removable closure, a portable hydrant constructed and adapted to be fixed on the terminal around the closure, means to so fix the hydrant, said hydrant comprising a central tubular body open clear at each end and having an intermediate outlet close above the ground level, said body being of a length to admit the hand and arm of an operator for the removal of the closure, and to form a water column to prevent overflow at the top.

2. A hydrant of the class described comprising a stationary terminal member having an annular channel concentric therewith, gasket material therein, said terminal member including a peripheral shoulder, a hydrant member comprising a duct member constructed and shaped to set in the channel, having diametrically opposed lateral members, clamping devices slidable therein longitudinally of the duct member and having laterally extended head portions, said clamping members being revoluble, and means for securing the members in clamped engagement with the shoulder of the terminal member as described.

3. In a connection of the class described, an annular seat member having a peripheral shoulder, a tubular duct member having an end portion constructed to set upon the seat, and having opposed ring sections coengaged therewith close to said end, each section having an out turned flange member with inturned ends, the opposed inturned ends being constructed for coengagement with a bolt member, a bolt member engaged therebetween, means to clamp the flanges against the bolt, said bolt having a head portion to engage said peripheral shoulder, and means to draw the bolt into clamping engagement with the shoulder as described.

In testimony whereof I have hereunto set my hand in presence of two subscribing witnesses.

LEONARD SCHLEGEL.

Witnesses:
MARY E. BOSWELL,
JOHN SCHLEGEL.

Copies of this patent may be obtained for five cents each, by addressing the "Commissioner of Patents, Washington, D. C."